United States Patent [19]

Kawahara

[11] 4,000,399

[45] Dec. 28, 1976

[54] PATTERN COUNTING SYSTEM USING LINE SCANNING

[75] Inventor: Atsushi Kawahara, Yokohama, Japan

[73] Assignee: Nippon Kogaku K. K., Tokyo, Japan

[22] Filed: Dec. 23, 1974

[21] Appl. No.: 536,035

[30] Foreign Application Priority Data

Dec. 28, 1973 Japan .............................. 49-1704

[52] U.S. Cl. ................ 235/92 PC; 340/146.3 CA; 340/146.3 MA

[51] Int. Cl.[2] ........................................ G06K 9/00

[58] Field of Search .............................. 235/92 PC; 340/146.3 MA, 146.3 H, 146.3 AC, 146.3 J, 146.3 Y, 146.3 CA

[56] References Cited

UNITED STATES PATENTS

| | | | |
|---|---|---|---|
| 3,106,699 | 10/1963 | Kamentsky | 340/146.3 H |
| 3,214,574 | 10/1965 | Landsman et al. | 340/146.3 H |
| 3,408,485 | 10/1968 | Scott et al. | 340/146.3 Y |
| 3,624,604 | 11/1971 | Gibbard | 340/146.3 MA |
| 3,805,028 | 4/1974 | Morton | 235/92 PC |
| 3,879,706 | 4/1975 | Favier et al. | 340/146.3 R |

*Primary Examiner*—Leo H. Boudreau
*Attorney, Agent, or Firm*—Shapiro and Shapiro

[57] ABSTRACT

A system for counting patterns in which each pattern in a scanning field is scanned along successive scanning lines and is sampled at successive points along each line to produce binary signals indicative of the presence or absence of the pattern at each sampling point. In order to avoid the problem of pores (holes or voids) in the patterns and the problem of concave pattern portions as seen in a given viewing direction perpendicular to the scanning direction, the digitized signals representing the original patterns are employed to produce mask signals which effectively eliminate the pores and concave pattern portions and which permit each pattern to be counted by counting a portion of the pattern that is convex as seen in the said viewing direction.

9 Claims, 7 Drawing Figures

PATTERN COUNTING SYSTEM USING LINE SCANNING

BACKGROUND OF THE INVENTION

1. Field of the Invention

This invention relates to a system for converting an image into electrical signals through line scanning and comparing electrical signals provided from two time-sequentially or spatially adjacent scanning lines to thereby count the number of patterns in the image.

The present invention is effective, for example, to count complicated patterns, which may contain pores (holes or voids).

2. Description of the Prior Art

Conventional pattern counting systems utilizing line scanning of an image field, such as those using conventional television rasters in which scanning along the x-axis direction is from left to right and along the y-axis direction from top to bottom of the field, are deficient with respect to the counting of patterns which are located below and to the right of portions of another pattern, so as to be shielded thereby.

SUMMARY OF THE INVENTION

The present invention overcomes the abovenoted disadvantages peculiar to the prior art and minimizes the dimensions of the uncountable regions or, in some patterns, eliminates such uncountable regions, thereby enhancing the accuracy with which patterns in an image field are counted.

In accordance with a preferred embodiment of the present invention, a system for counting patterns is provided in which each pattern is converted to a binary image by scanning the pattern along successive horizontal scanning lines $n$ in a field of $m$ scanning lines, for example, and by sampling the pattern at each sampling point $i$ of K sampling points spaced regularly along each of the scanning lines. The binary signals produced by the sampling of each pattern are employed to produce corresponding mask signals. The effect of the mask signals is to fill in the pores and concave portions of each pattern so as to leave a convex portion which can be counted, by comparison of the mask signals from successive scanning lines, thereby to produce a count of the number of patterns in the image field. In one embodiment parallel iterative logic circuits are employed, including a plurality of shift registers and mask pattern generating cells, to produce the ultimate mask signals that are used in the counting of patterns. In a further embodiment the mask signals employed for convex portion counting are generated in serial fashion from the original binary signals by a circuit utilizing storage devices, reversible counters, delay devices, and associated logic gates.

The invention will become more fully apparent from the following detailed description taken in conjunction with the accompanying drawings.

DESCRIPTION OF THE PREFERRED EMBODIMENTS

The principle of the present invention will first be described with reference to FIGS. 1 and 2.

Figure 1:
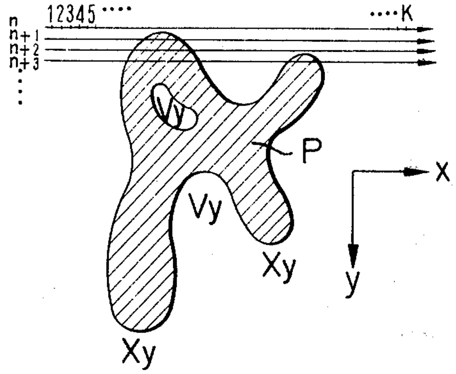
FIG. 1 shows an example of the original image used for illustration of the principle of counting in the pattern counting system of the present system, as well as the method whereby the original image is scanned.
Figure 2:
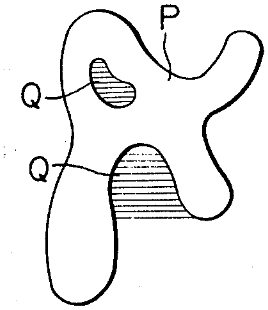
FIG. 2 shows a mask pattern produced from the original image of FIG. 1 in accordance with the present invention.

It is assumed that, when the rectangular coordinates x, y are defined in the shown direction with respect to the image in FIG. 1, scanning occurs in the x-axis direction for each scanning line and in the y-axis direction for successive scanning lines, in the order of $n \rightarrow n+1 \rightarrow n+2 \rightarrow \ldots$, where $n$ is any scanning line in a field of $m$ scanning lines, for example. It is known that by applying the threshold detecting technique to an electrical signal generated for each scanning line and by effecting sampling at K points equidistant in the x-axis direction, there may be provided a binary image digitized to provide a "1" or "pattern phase" when the pattern is present at the sampling point and a "0" or "non-pattern phase" when the pattern is not present. It is further known that, when the pattern P, indicated by hatching in FIG. 1, is seen in the direction opposite to the y-axis direction (or in the upward direction from below FIG. 1 in the drawing sheet) and if the convex portion and the concave portion are called Xy and Vy, respectively, then the Euler number E(P) of the pattern P in the image is given by the total number N(Xy) of the convex portions and the total number N(Vy) of the concave portions, as follows:

$$E(P) = N(Xy) - N(Vy) \quad (1)$$

At the same time, the Euler number E(P) is expressed by the number, B, of patterns in the image and the number, L, of pores included in those patterns, as follows:

$$E(P) = B - L \quad (2)$$

As can be seen from equation (2), the Euler number E(P) usually is an integer which can assume either a positive or a negative value, but if no pore is present in the patterns, the Euler number will be a positive integer or zero which in turn is equal to B, the number of patterns. Therefore, if the pores in the patterns could be brought into the same phase as the patterns by some method or other, the pattern count could simply be obtained from the Euler number. Thus, if the number N(Vy) of the concave portions present in the patterns could be made zero, the following simple relation would be satisfied by equations (1) and (2):

$$B = E(P) = N(Xy) \quad (3)$$

Based on these facts, the present invention produces, from a subject pattern, a new pattern which will satisfy N(Vy) = 0 and which will only provide a minimum necessary variation for that subject pattern (such new pattern will hereinafter be referred to as "mask pattern"), thereby accomplishing counting of the patterns in the image field.

A mask pattern which will satisfy N(Vy) = 0 and which will only provide a minimum necessary variation for the original pattern may be obtained by treating two factors for N(Vy), namely, pores and concave portions such that the pores are all filled until they are in phase with the pattern and that the pattern phase is enlarged until the concave portions have boundary lines parallel to the scanning lines. This is shown in FIG. 2. In FIG. 2, P designates a region belonging to the subject pattern, Q designates regions newly provided to bring about the relation that N(Vy)=0, and the mask pattern is a region $P \nu Q$ which is the so-called sum-set of the subject pattern P and the newly provided pattern Q.

An embodiment based on the principle of the present invention will now be described with reference to FIGS. 3 and 4.

Hereinafter, the signal related to the original image is denoted by S, the signal related to the mask image is denoted by M, and when a picture element of an image is designated by the number $n$ of the scanning line to which that picture element belongs and the number $i$ of the sampling point in the scanning direction on line $n$, the value of the picture element of the subject image is denoted by $S_i^n$ and the value of the picture element of the corresponding mask image is denoted by $M_i^n$. Since a binary image is herein considered, both $S_i^n$ and $M_i^n$ assume a logic value of 1 or 0.

When the value $M_i^{n+1}$ of the picture element of the mask image corresponding to the ($n$+1)th scanning line is to be produced (in a manner to be described), it is found that the signal $M_i^n$ for the line preceding the ($n$+1)th scanning line and the signal $S_i^{n+1}$ from the ($n$+1)th scanning line are not sufficient to fill the pattern phase for the shaded regions (pored portions and concave portions).

It is necessary to add additional information from adjacent picture elements (sampling points). This additional information will be designated Ri and Li, and assuming a horizontal scanning direction, R stands for —right— and L stands for —left—, meaning the right and left adjacent picture elements, the letter $i$ indicating the number of the picture element or sampling point on the scanning line. With such definition of the signal given, the production of mask image may be realized by the following logical equations:

$$M_i^{n+1} = (S_i^{N+1} + L_{i+1}).(S_i^{n+1} + R_{i-1}) \quad (4)$$

$$Li = M_{i-1}^n.\ (S_i^{n+1} + L_{i+1}) \quad (5)$$

$$Ri = M_{i+1}^n.(S_i^{n+1} + R_{i-1}) \quad (6)$$

where $i = 1, 2, 3, \ldots$ K, and where the following initial conditions exist:

$$M_i^0 = 0 \quad (7)$$

$$L_{k+1} = 0 \quad (8)$$

$$R_0 = 0 \quad (9)$$

Equation (4) shows that the picture element $M_i^{n+1}$ of the mask image is produced from the picture element $S_i^{n+1}$ of the corresponding original image and the propagation signals $R_{i-1}$ and $L_{i+1}$ from the picture elements adjacent thereto, and equations (5) and (6) show the conditions under which the leftward and rightward signals are produced.

Figure 3:
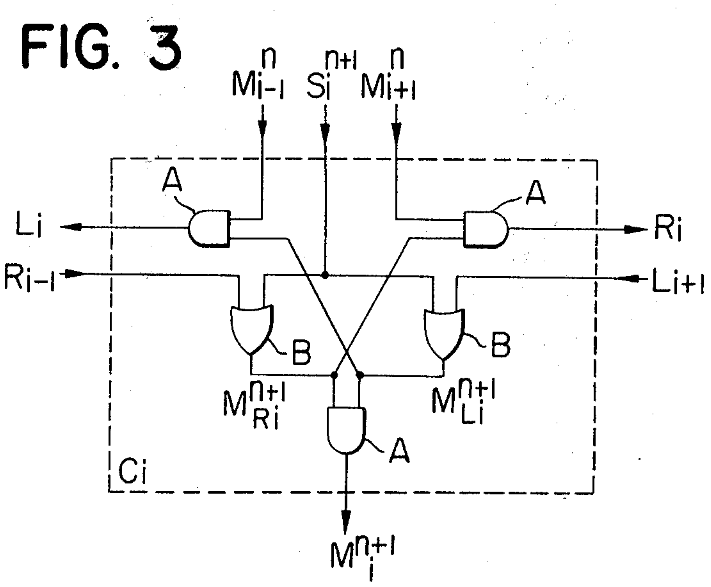
FIG. 3 diagrammatically shows the circuit arrangement of a mask pattern generating cell based on the mask pattern producing logic of the present invention.

A mask pattern producing cell (or mask signal element generator) Ci shown in FIG. 3 may be derived from equations (4), (5) and (6), and this cell may be said to be a circuit which has spatially realized the mask pattern producing logic shown by equations (4), (5) and (6). In FIG. 3, letter A designates an AND gate and letter B designates an OR gate. FIG. 4 shows a parallel type mask pattern producing circuit constituted by iterative logic including the mask pattern producing cells Ci (hereinafter simply referred to as the producing cells).

Figure 4:
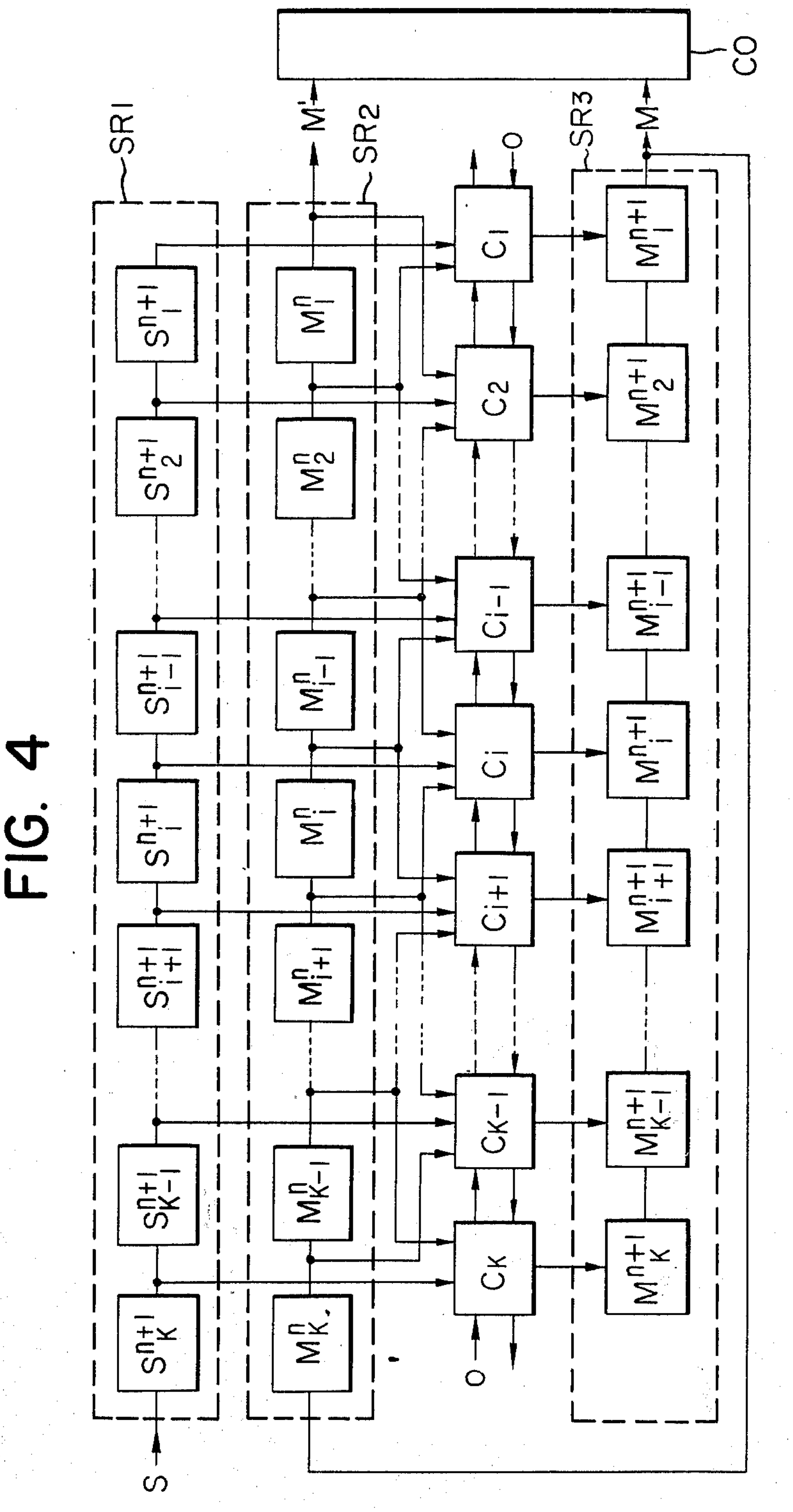
FIG. 4 diagrammatically shows an example of the parallel type of mask pattern producing circuit.

Describing a sequence of operations with reference to FIG. 4, the image signal S generated in time series by linear scanning is temporally stored in a serial-in parallel-out type shift register $SR_1$ of K bits equal to the number of the picture elements per scanning line, and the parallel outputs thereof are applied as inputs to the corresponding producing cells Ci, whereby an image signal $S_i^{n+1}$ related to the ($n$+1)th scanning line is imparted to each producing cell Ci.

Each producing cell Ci also receives as inputs the mask image signal $M_{i+1}^n$ already produced for the $n$th scanning (line and stored in the shift register $SR_2$) while, at the same time, each producing cell Ci also receives as inputs signals $R_{i-1}$ and $L_{i+1}$ from adjacent producing cells Ci, and produces signals Ri and Li as outputs. After information has entered all of the shift registers $SR_1$ and $SR_2$ and the signals R and L have passed through the gate of each producing cell Ci, the output of each producing cell Ci produces a mask signal element $M_i^{n+1}$ for the (n+1)th scanning which will satisfy equations (4), (5) and (6). Such signal elements are read out, and are fed in parallel to parallel-in serial-out shift register $SR_3$ having stages for storing K bits and are further read out from register $SR_3$ serially in synchronism with the S signal input for a new scanning, whereby there is produced the ($n$+1)th mask image signal M. The mask image signal M is at once transferred to the shift register $SR_2$ to produce a newer mask image.

Figure 5:
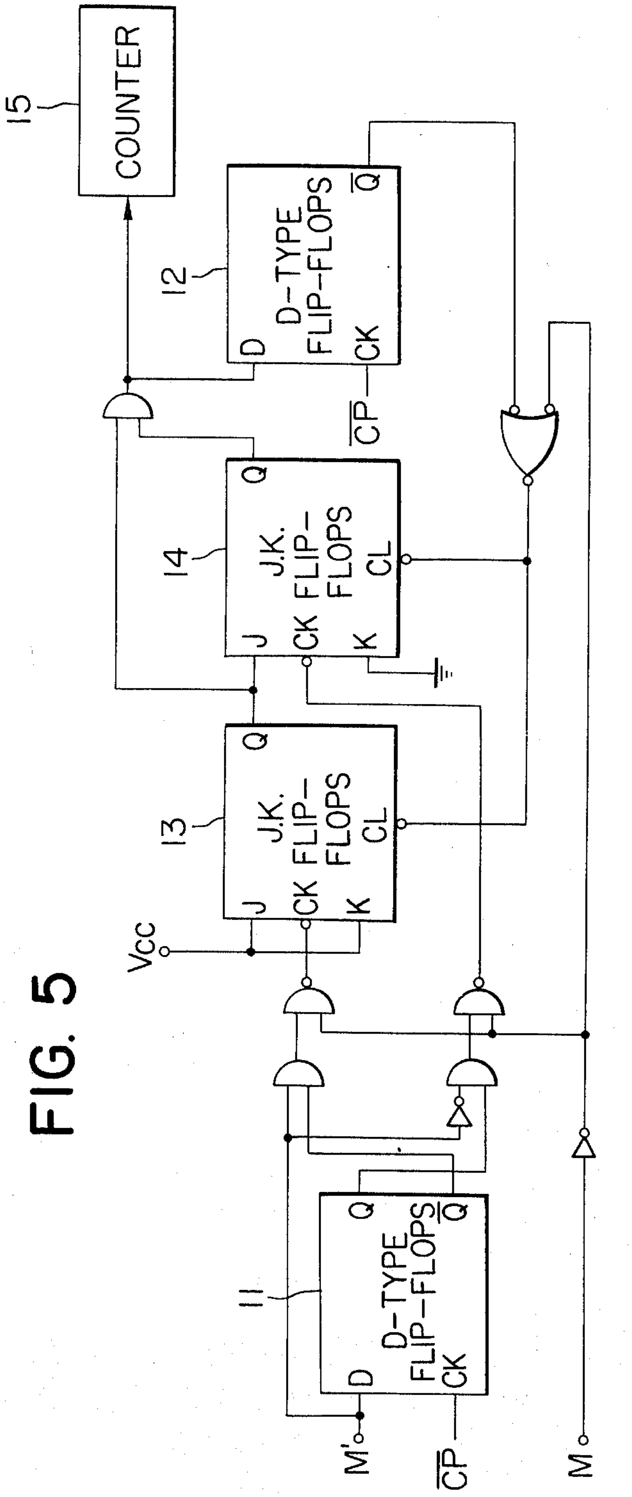
FIG. 5 is a block diagram of a convex portion counting circuit.

The output signal M' of the shift register $SR_2$ is a mask image signal delayed by one scanning line with respect to the mask image signal M. A device CO uses these two signals M and M' to count the mask patterns, and more particularly, count N(Xy), and the circuit thereof is shown in FIG. 5 and will be described below.

The circuit comprises logic elements and includes D-type flip-flops 11 and 12, J-K flip-flops 13 and 14, and a counter 15 for receiving, as input, a signal, synchronously shaped with respect to the rising of the clock pulse CP, obtained by the arrangement of FIG. 4, thereby counting N(Xy). Clock Pulses from the same clock pulse generator (not shown) and other conventional circuitry may be used to control the serial and parallel shifting of bits in the circuit of FIG. 4 in a well known manner.

Figure 6B:
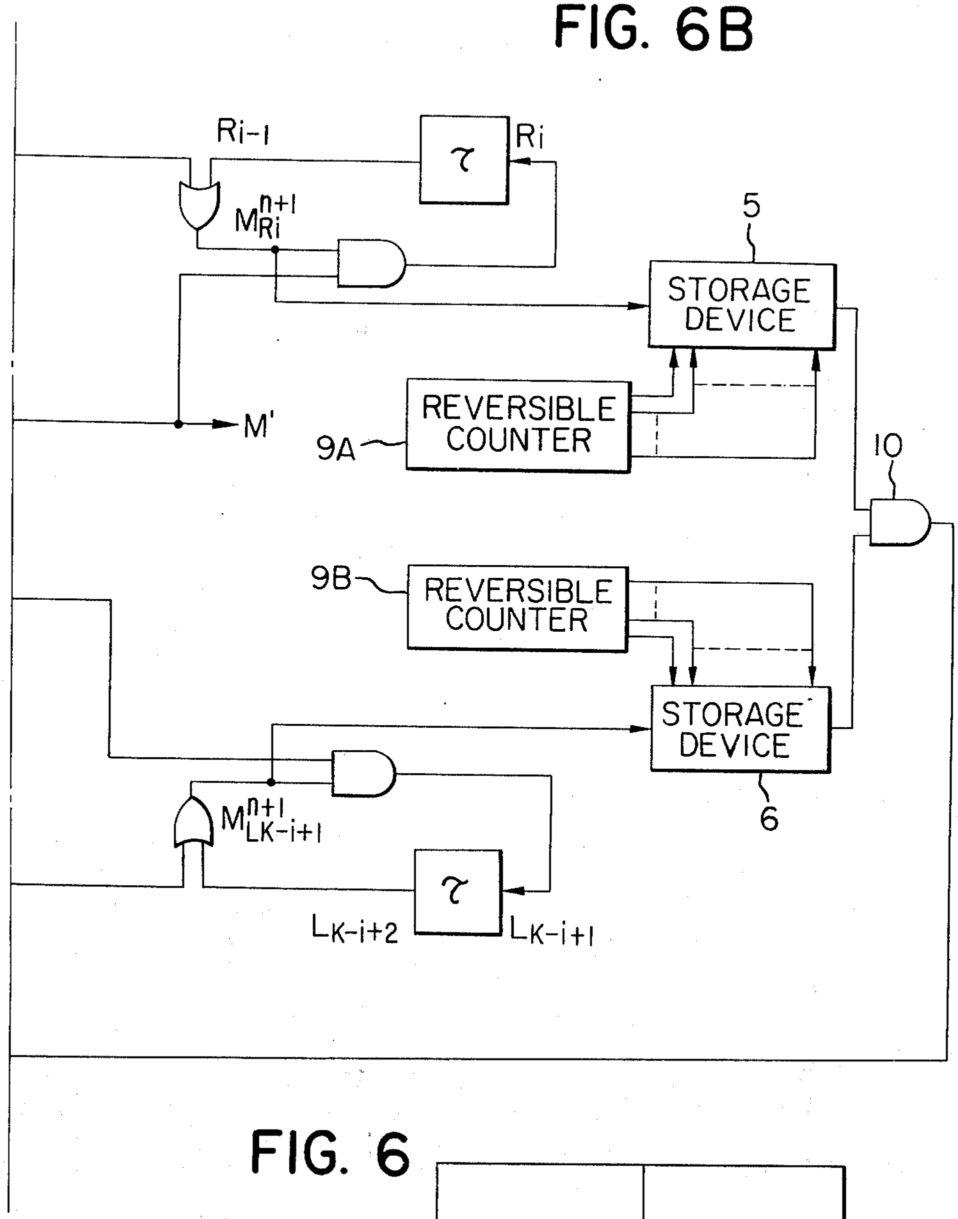
FIGS. 6A and 6B taken together diagrammatically show an example of a serial type of mask pattern producing circuit.
Figure 6:
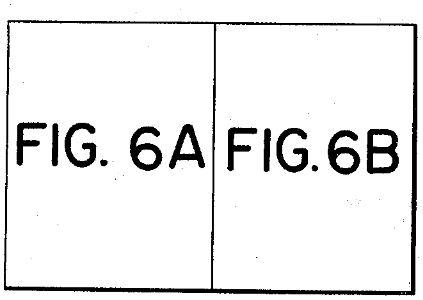

FIG. 6 shows another embodiment for realizing the mask pattern producing logic of the present invention and this employs a time-serial operation, in lieu of the parallel operation employed in FIG. 4. From the right term of equation (4), it is known that a mask image may be created by producing $$M_{Ri}^{n+1} = S_i^{n+1} + R_{i-1} \quad (10)$$

$$M_{Li}^{n+1} = S_i^{n+1} + L_{i+1} \quad (11),$$

and then taking the logic product thereof. This may simply be realized by using signal storage means such as random access storage devices 1, 2, 3, 4, 5 and 6 having a storage capacity of K bits per scanning line and by designating therein addresses with the aid of reversible counters 7, 8, 9A and 9B. The input image signal S related to the $(n+1)$th scanning may be written into the random access storage devices 1 and 4 for the picture elements 1 to K on the scanning line by forwardly counting the reversible counters 7 and 8. Concurrently therewith, the mask image signal M for the nth scanning line is stored in the storage devices 2 and 3 with the aid of the same reversible counters. Subsequently, the counters 7 and 8 are reset, whereafter forward count is again effected with the counter 7 while reverse count is effected with the counter 8 to read out the stored information, whereby the picture elements from No. 1 onward are successively read out from the storage devices 1 and 2 and the picture elements from No. K onward are successively read out from the storage devices 3 and 4. If a circuit using one OR gate, one AND gate and two delay elements $\tau$per picture element is used with respect to each of the output of the storage device 1 and the output of the storage device 2, Ri in equation (3) will be obtained with the result that there will occur the production of $M_{Ri}^{n+1}$ which will satisfy equation (10). With respect to the storage devices 3 and 4, there will likewise occur the production of $M_{Li}^{n+1}$ which will satisfy equation (11). Thus, by causing the storage device 5 to store $M_{Ri}^{n+1}$ as forward count is effected with the reversible counter 9A and by causing the storage device 6 to store $M_{Li}^{n+1}$ as reverse count is effected with the reversible counter 9B, and by causing forward count again to be effected with the reversible counters 9A and 9B in synchronism with the first-described reading operation for a new image input S to thereby read out $M_{Ri}^{n+1}$, and then taking the logic product thereof with the aid of the AND gate 10, there will be provided at the output of that AND gate a mask pattern signal M similar to that provided by the previous embodiment. This signal M may be read by the storage devices 2 and 3 in the same manner as that described previously. The output of the convex portion counting circuit Co with M and M′ as the inputs thereto, M′ being the output of the storage device 2, represents the number of patterns as in the previous embodiment.

The present invention, as has been described above, enables the number of patterns in porous or other complicated configuration to be counted with great ease and high accuracy.

I claim:

1. In a system for counting patterns by sampling the patterns at successive sampling points along successive scanning lines and producing a digital signal at each scanning point depending upon the presence or absence of the pattern at such points, the improvement comprising means responsive to the digital signals for producing corresponding mask signals which eliminate pattern pores and concave pattern portions, and means responsive to the mask signals corresponding to successive scanning lines for counting a convex portion of each pattern and thereby counting the number of patterns.

2. A system in accordance with claim 1, wherein said means for producing said mask signals comprises first means for storing the digital signals produced by the sampling at successive sampling points along one scanning line, second means for storing mask signal elements for corresponding sampling points along the preceding scanning line, third means for storing mask signal elements for corresponding sampling points along said one scanning line, mask signal element generating means responsive to signals stored in said first and second storing means for generating the mask signal elements stored in the third storing means, means for transfering the mask signal elements stored in the third storing means to the second storing means, and means for reading out the mask signal elements stored in the second and third storing means and for applying the same to said counting means.

3. A system in accordance with claim 2, wherein said storing means comprise shift registers having successive stages for storing successive digital signals or mask signal elements, said first and second storing means comprising serial-input, parallel-output shift registers, said third storing means comprising a parallel-input, serial-output shift register, and said second shfit register also having a serial output, said serial outputs being applied to said counting means.

4. A system in accordance with claim 1, wherein said counting means comprises means for comparing successive mask signals.

5. A system in accordance with claim 1, wherein said mask signal producing means comprises successive mask signal element generators, each comprising a logic circuit having the configuration shown in FIG. 3.

6. A system in accordance with claim 1, wherein said mask signal producing means comprises successive mask signal element generators, each having logic means operating in accordance with the following logic equation:

$$M_i^{n+1} = (S_i^{n+1} + L_{i+1}) \cdot (S_i^{n+1} + R_{i-1})$$

where $n$ represents any scanning line, $i$ represents any sampling point on a scanning line, M represents a mask signal element for a designated scanning line and sampling point thereon, S represents a digital signal for a designated scanning line and sampling point thereon, and L and R are defined by the following logic equations:

$$Li = M_{i-1}^{n} \cdot (S_i^{n+1} + L_{i+1})$$

$$Ri = M_{i+1}^{n} \cdot (S_i^{n+1} + R_{i+1}).$$

7. A system in accordance with claim 1, wherein said mask signal producing means comprises means for producing right and left mask signals $M_{Ri}^{n+1}$ and $M_{Li}^{N+1}$, respectively in accordance with the following logic equations:

$$M_{Ri}^{n+1} = S_i^{n+1} + R_{i-1}$$

$$M_{Li}^{n+1} = S_i^{n+1} + L_{i+1}$$

where $n$ represents any scanning line, $i$ represents any sampling point on a scanning line, M represents a mask signal element for a designated scanning line and sampling point thereon, S represents a digital signal for a designated scanning line and sampling point thereon, and L and R are defined by the following logic equations:

$$Li = M_{i-1}^{n} \cdot (S_i^{n+1} + L_{i+1})$$

$$Ri = M_{i+1}^{n} \cdot (S_i^{n+1} + R_{i-1})$$

and means for producing the logic product of said right and left mask signals.

8. A system in accordance with claim 1, wherein said means for producing said mask signals comprises a first storage device for storing the digital signals produced by the sampling at successive sampling points along one scanning line, successively in a scanning direction, a second storage device for storing mask signal elements for the corresponding sampling points of the preceding scanning line, successively in said scanning direction, a first mask signal generator for receiving signals from said first and second storage devices and generating a mask signal for said one scanning line in said scanning direction, a third storage device for storing digital signals produced by the sampling of said one scanning line at said sampling points thereof, successively in a direction opposite to said scanning direction, a fourth storage device for storing mask signal elements for said corresponding sampling points of said preceding scanning line, successively in said opposite direction, a second mask signal generator for receiving said signals from said third and fourth storage devices and generating a mask signal for said one scanning line in said opposite direction, means for producing the logic product of the mask signal in said scanning direction and the mask signal in said opposite direction, means for connecting the output of said product-producing means to said second and fourth storage devices as an input thereto, and means for connecting said output of said product-producing means and said second storage device to said counting means.

Figure 6A:
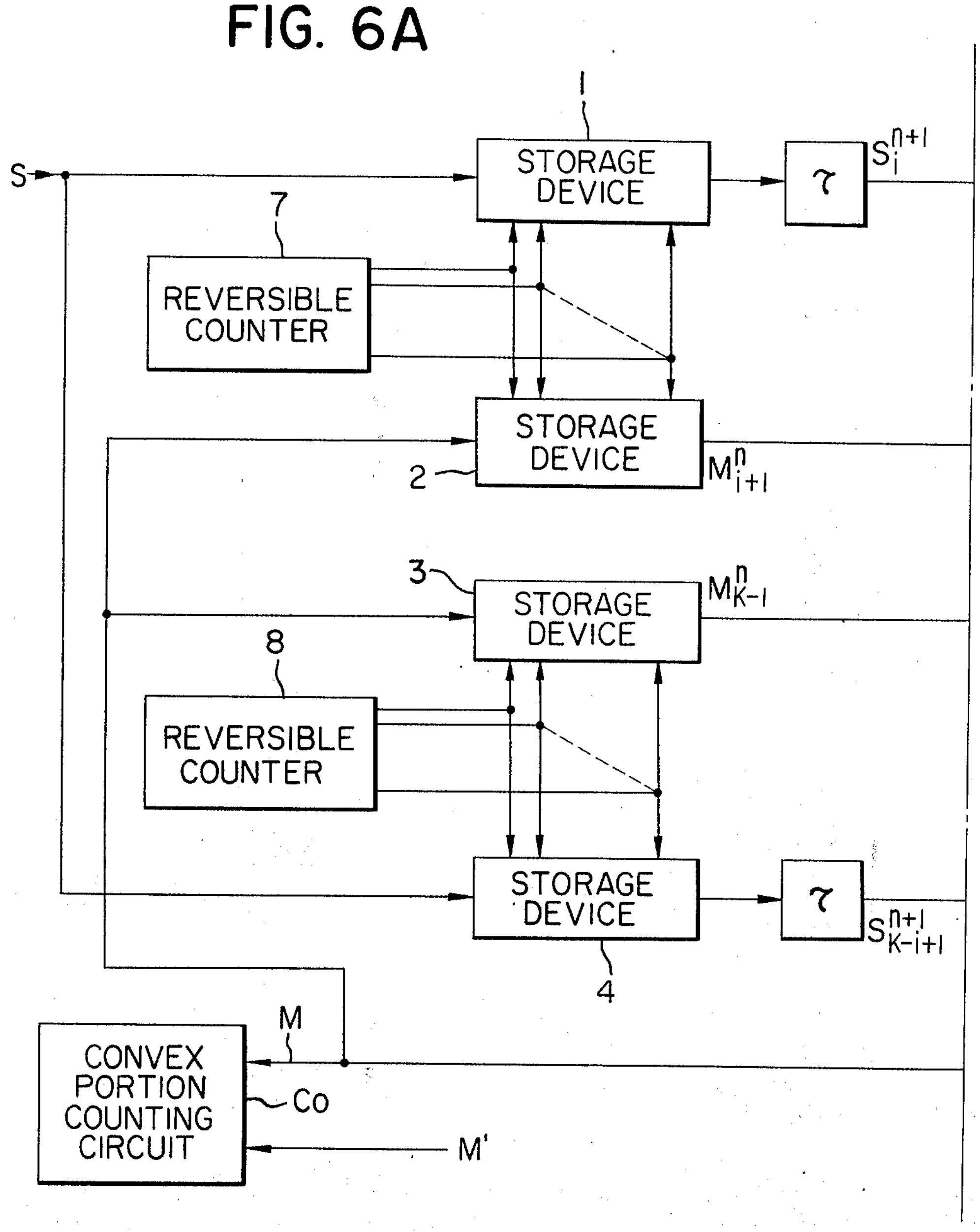

9. A system in accordance with claim 1, wherein said mask signal producing means comprises a circuit having the configuration of FIGS. 6A–6B.

* * * * *